United States Patent [19]

Bohman

[11] Patent Number: 5,070,682

[45] Date of Patent: Dec. 10, 1991

[54] ACOUSTIC DETECTOR WITH START-UP CONTROL

[75] Inventor: Carl E. Bohman, New Holland, Pa.

[73] Assignee: Ford New Holland, Inc., New Holland, Pa.

[21] Appl. No.: 603,607

[22] Filed: Oct. 26, 1990

[51] Int. Cl.⁵ .............................................. A01D 75/18
[52] U.S. Cl. ...................................... 56/10.2; 56/10.8;
56/DIG. 2; 56/DIG. 15
[58] Field of Search ................................ 56/10.2–10.4,
56/10.8, 504, 505, 289, 229, 153, DIG. 1, DIG.
2, DIG. 15, DIG. 16, DIG. 17, DIG. 17, 250;
460/1, 2, 3, 105, 149, 150, 119

[56] References Cited

U.S. PATENT DOCUMENTS

| | | | |
|---|---|---|---|
| 3,889,249 | 6/1975 | Bennett, Jr. et al. | 460/2 |
| 3,959,953 | 6/1976 | Garrott | 56/10.2 |
| 3,972,156 | 8/1976 | Bennett, Jr. et al. | 460/3 |
| 4,193,248 | 3/1980 | Gilleman | 460/3 |
| 4,261,161 | 4/1981 | Colgrove et al. | 460/3 |
| 4,275,546 | 6/1981 | Bohman et al. | 56/10.2 |
| 4,290,255 | 9/1981 | Martenas | 460/2 |
| 4,353,199 | 10/1982 | Chow et al. | 56/10.2 |
| 4,433,528 | 2/1984 | Bohman | 56/10.2 |

Primary Examiner—Terry L. Melius
Attorney, Agent, or Firm—Griffin, Branigan & Butler

[57] ABSTRACT

In a forage harvester having an acoustic detector for sensing air-borne sounds produced by the impact of hard foreign objects on the crop feed mechanism of the harvester, a start-up control is provided for inhibiting the detector output during the intervals when the crop feed mechanism is stopped or being brought up to running speed. In forage harvesters having metal detectors for sensing the presence of metal in the crop material, the electromagnetic sensor in the metal detector inherently produces a noise output signal which is dependent on the speed of the crop feed mechanism, and this signal is used to control the inhibiting of the acoustic detector output.

10 Claims, 3 Drawing Sheets

ACOUSTIC DETECTOR WITH START-UP CONTROL

RELATED APPLICATIONS

This application discloses subject matter which is disclosed and claimed in the concurrently filed applications of Carl E. Bohman et al. Ser. No. 07/603,606 entitled Method and Apparatus For Hard Object Detection, Carl E. Bohman et al. Ser. No. 07/603,609 entitled Metal and Hard Object Detectors with Shared Fixed Support Inside a Feed Rool, and John R. McClure et al. Ser. No. 07/603,608 entitled of a Shear Bar Using Air-borne Sound Detector.

BACKGROUND OF THE INVENTION

1. Field of the Invention

The present invention relates to an acoustic detector for detecting the presence of hard foreign objects in a material being transported along a feed path by a feed mechanism. More particularly, the present invention relates to an acoustic detector having inhibit means associated therewith for inhibiting any output signal from the detector during periods of time when the feed mechanism is stopped or is moving at less than its normal operating speed. The invention is particularly suited for use with agricultural harvesting equipment but finds use in material feed mechanisms of general utility.

2. Description of Prior Art

The problem of hard foreign materials in crop material being processed by agricultural harvesting equipment moving across farm fields is well known and much time and money has been expended in efforts to solve the problem. Magnetic detection systems such as that disclosed in U.S. Pat. No. 3,959,953 to Garrott have been developed for the detection of ferrous metal objects in crop material. However, magnetic detection systems are not capable of detecting non-ferrous hard objects such as stones.

U.S. Pat. No. 4,353,199 to Chow et al. discloses an acoustic system for detecting the presence of stones and other hard foreign objects in crop material being fed through a forage harvester. In this system a piezoelectric acoustic sensor is mounted on the interior surface of a rotatable crop feed roll so as to sense vibrations induced in the feed roll by hard objects striking its exterior surface. However, this system requires that the feed roll be shock mounted so as to isolate the feed roll (and thus the sensor) from machine generated vibrations. Furthermore, since the sensor rotates with the feed roll in which it is mounted, a rotary coupling or slip ring must be provided in order to transmit signals generated by the sensor to circuitry, external of the feed roll, which controls the stopping of the feed mechanism of the harvester.

The concurrently filed application of Carl E. Bohman et al., Ser. No. 07/603,606 discloses and claims an acoustic detector system for detecting stones and other hard objects in a material being transported along a feed path of a forage harvester by a feed mechanism, the acoustic detector system including a microphone disposed in a fixed position inside a feed roll and producing output signals in response to air-borne sound waves induced inside the feed roll by impacts of hard foreign objects on the feed mechanism. The microphone responds to the sound waves by producing an output signal for stopping the feed mechanism.

Acoustic hard object detection systems, whether responsive to air-borne sound waves as in the Bohman et al. application or mechanically transmitted vibrations as in the Chow et al. patent, are sensitive to sounds and vibrations produced as drive power is initially applied to the feed mechanism. Also, the impact of tools on the harvester during repair and adjustment periods tend to trigger the detector system thereby stopping the feed mechanism. To overcome these problems, it has been customary to reduce the sensitivity of the acoustic detector system. However, this reduced sensitivity reduces the ability of the detector system to detect small stones and other hard objects during normal operation.

BRIEF SUMMARY OF THE INVENTION

An object of the present invention is to provide a novel method and apparatus for controlling an acoustic detector system for detecting hard objects in a material being transported by a feed mechanism whereby the system is insensitive to all sounds and vibrations during intervals when the feed mechanism is not running at a minimum operating speed.

An object of the present invention is to provide an acoustic detector system as described above which is more sensitive than prior art acoustic detector systems during intervals when the feed mechanism is running at its normal operating speed.

According to the method of the present invention, all signals produced by an acoustic hard object detector are inhibited during intervals when the material feed mechanism is stopped, and during a start-up interval when it is running at less than an enabling speed. Apparatus for carrying out the method may take many forms but in a forage harvester having a metal detector it is advantageous to use signals generated by the metal detector for inhibiting the output signal from the hard object detector.

Other objects, features and advantages of the invention and its mode of operation will become apparent upon consideration of the following description and the accompanying drawings.

DETAILED DESCRIPTION OF THE INVENTION

Figure 1:
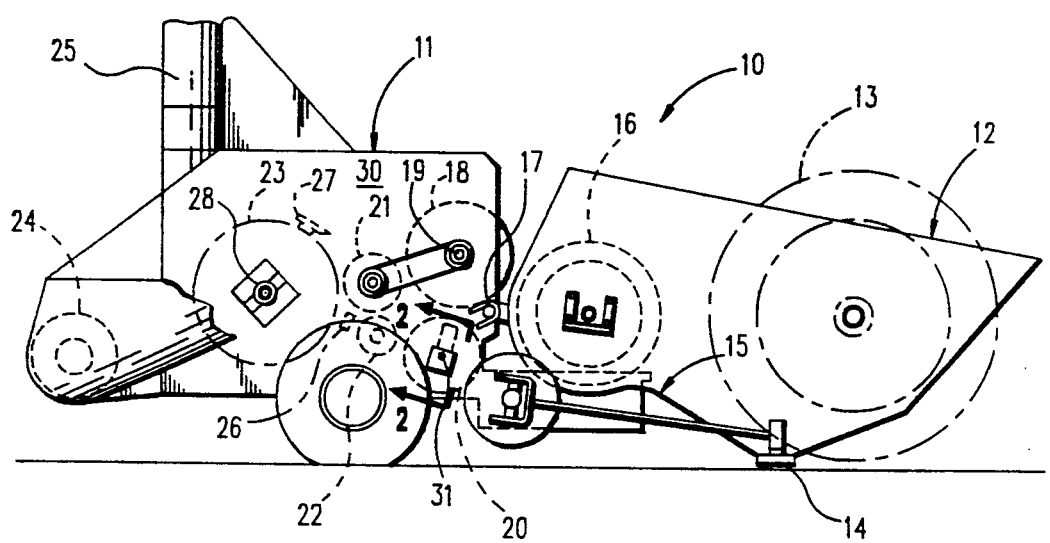
FIG. 1 is a schematic side view of a forage harvester in which the invention may be used.

FIG. 1 illustrates an improved forage harvesting machine of the kind in which the present invention may be employed. It is apparent that the invention may also be employed with benefit for the protection of other types of farm machinery, and that it has other monitoring and alarm actuating applications aside from protecting farm machinery from damage caused by the ingestion of stones and other hard objects. The representative farm machine illustrated in FIG. 1 may be similar to the forage harvester in U.S. Pat. Nos. 3,523,411 and 3,959,953 to Garrott.

The forage harvester, generally designated by reference numeral 10, comprises a base unit 11 and an attachment 12 for gathering crop material and feeding it to the base unit for processing. Attachment 12 directly cuts crop material in the field and feeds it to base unit 1 where it is chopped and eventually conveyed to a trailing forage wagon (not shown). A direct cut attachment is shown for exemplary purposes but in actual practice any type of attachment, e.g., a row crop unit or a windrow pickup, could be used with a base unit of the type shown insofar as the present invention is concerned.

More particularly, the attachment shown includes a reel 13, depicted in phantom, which operates in a conventional manner to guide material over a cutter bar 14 and up an inclined floor 15 to a consolidating auger 16, also depicted in phantom outline. Attachment 12 is pivotally mounted to base unit 11 at 17 and is adapted to feed crop material to the space between upper and lower front reed rolls 18, 20 and then on to upper and lower rear feed rolls 21, 22 which in turn feed material to a cutterhead 23 (shown in phantom) which chops the crop material and guides it rearwardly to conveyor means 24 in a well known manner. The conveyor 24 commonly comprises an auger mounted transversely for feeding the chopped crop material to a blower unit which conveys it upwardly via a vertical spout 25 (partially shown) and then rearwardly to a trailing forage wagon.

The front and rear pairs of upper and lower feed rolls compress into a mat-like configuration the crop material which has been gathered by the attachment and consolidated by auger 16. The mat of material is fed rearwardly across the top surface of a shearbar 26 which is operatively associated with a series of cutting elements 27 (one of which is shown in phantom) on rotating cutterhead 23 journaled for rotation by mounting assembly 28 in sidewall 30 of base unit 11.

The present invention is directed to start-up control of an apparatus for detecting stones and other hard objects in the crop material being fed to cutterhead 23. More particularly, it is concerned with start-up control of a detection means mounted in the lower front feed roll 20 for detecting stones and other hard objects in the compressed mat and initiating a control signal in response thereto for discontinuing transport of the crop material prior to introduction of the sensed object to the area at which the shearbar 26 and cutterhead 23 cooperatively engage and cut the crop.

Figure 2:
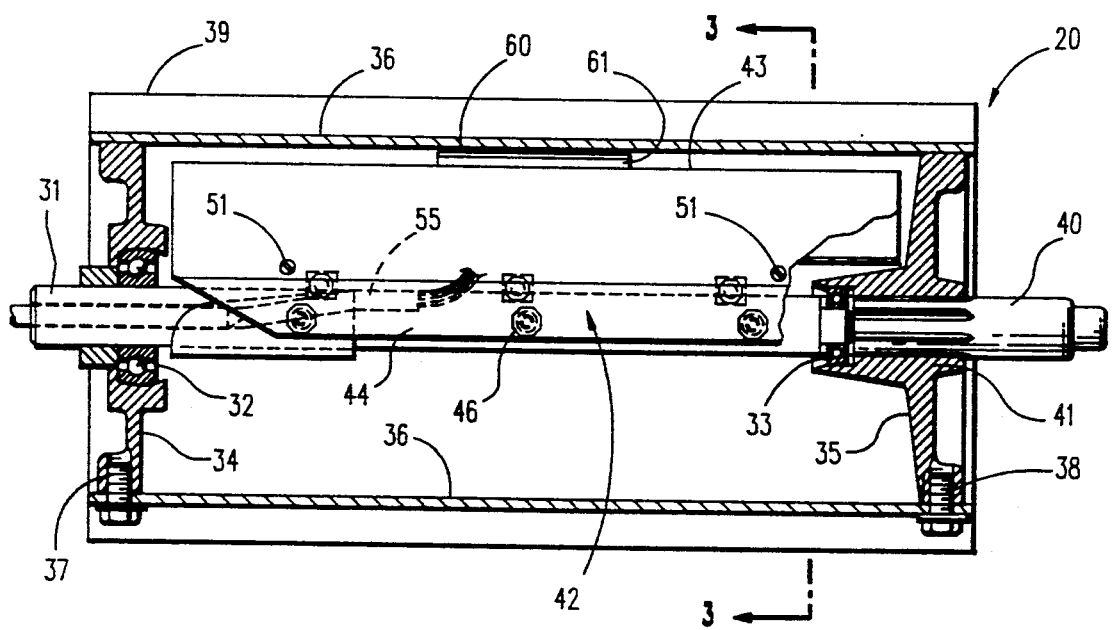
FIG. 2 is a part-sectional view taken along line 2—2 of FIG. 1 and illustrating a microphone supported within a rotatable feed roll.

Lower front feed roll 20, shown in detail in FIG. 2, includes a stationary shaft 31 on which the feed roll is journaled for rotation in bearing assemblies 32, 33 suitably mounted in feed roll end caps 34, 35. A generally tubular outer wall 36 of the feed roll is secured to end caps 34, 35 by fastening means 37, 38. A series of radial aggressive nonferrous flange elements 39 are provided for engaging and feeding the mat of crop material in the usual manner.

A splined stub drive shaft 40 is contained by a collar 41 forming an integral part of end cap 35. When drive shaft 40 is rotated by a feed drive mechanism (not shown) of the forage harvester, the drive force rotates feed roll end caps 34, 35 and the tubular outer wall 36 of the feed roll. Bearings 32, 33 permit rotation of the end caps even though the shaft 31 remains stationary. In this regard, the left end of shaft 31, as viewed in FIG. 2, may be keyed to a support block affixed to the frame of the forage harvester as shown in the aforementioned patent to Chow, et al.

Figure 3:
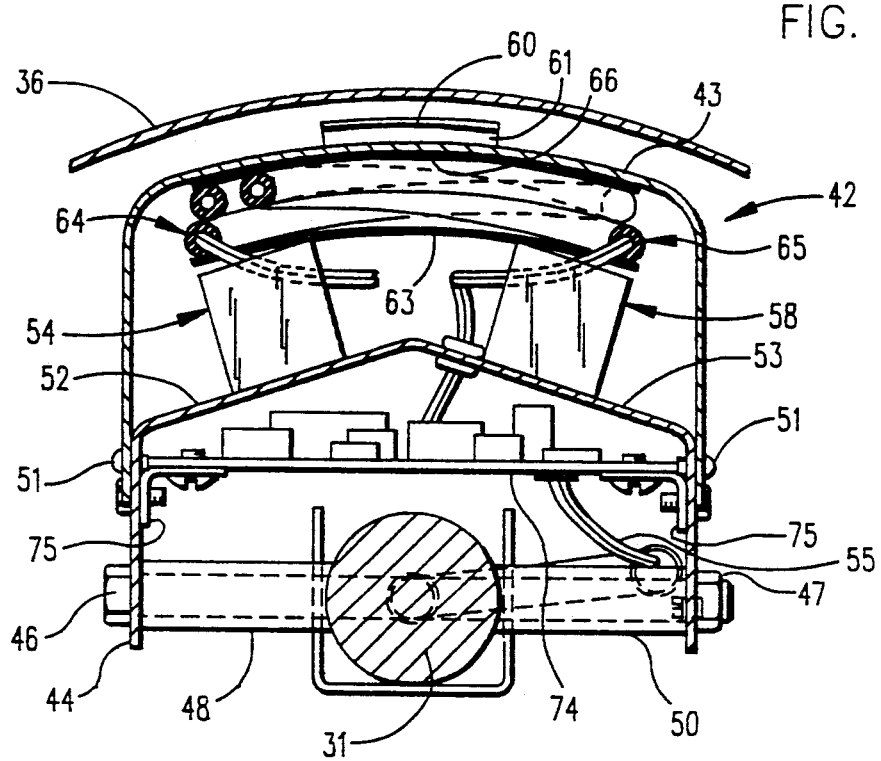
FIG. 3 is a sectional view taken along line 3—3 of FIG. 2 illustrating the support for a microphone.

Referring generally to FIGS. 2 and 3, a metal detector assembly 42 is mounted on the stationary shaft 31 as described in U.S. Pat. No. 4,433,528 to Bohman. The metal detector assembly 42 includes a cover plate 43 and a mounting plate 44 which serve to support and cover the magnet sets 54, 58, printed circuit board 74 and sensing coils 64, 65 of the two-channel metal detector. Mounting plate 44 is secured to fixed shaft 31 by a series of bolts 46 and nuts 47 spaced by spacers 48, 50 disposed between the inner surface of plate 44 and shaft 31. Cover plate 43 is secured to, and aligned with, the outer surface of mounting plate 44 by a series of metal screws 51. The printed circuit board 74 carries circuitry for the processing of signals generated by the sensing coils 64, 65. The printed circuit board 74 is mounted on brackets 75 which are in turn attached to mounting plate 44. The sensing coils 64, 65 and magnets sets 54, 58 are mounted in a region above the inclined surfaces 52, 53 of mounting plate 44 and below the cover plate 43 as illustrated in the above-mentioned Bohman patent. A first pad 66 electrically insulates the sensing coils 64, 65 from the interior upper surface of cover plate 43 while a second pad 63 insulates the coils from magnets 54, 58.

Briefly, the sets of magnets 54, 58 generate a magnetic field which extends into the crop feed path. When a ferrous object passes through the field it changes the field and this change is sensed by sensing coils 64, 65.

Conductors for carrying signals from the printed circuit board 74 to external control circuits for stopping the crop feed mechanism of the harvester are gathered into a cable 55. The fixed shaft 31 is provided with a channel or passageway through which the cable 5 is routed to the external control circuits.

In accordance with the principles of the present invention an acoustic sensor in the form of a microphone 60 is mounted in the interior of feed roll 20 to sense air-borne sound waves resulting from impacts of hard objects on the crop feed mechanism. As shown in FIG. 3, the microphone 60 may be mounted on the exterior top surface of cover plate 43. An acoustic isolator 61 is provided between the microphone 60 and the cover plate 43 to minimize or impede transmission of machine vibrations through shaft 31, mounting plate 44 and cover plate 43 to the sensor. Lead wires (not shown) from the microphone may be routed through a hole in cover plate 43 to signal processing circuits on printed circuit board 74 and the processed signals may be routed through leads in cable 55 to control circuits which control the stopping of the crop feed mechanism.

The microphone 60 may be a sheet or strip of thin film polyvinylidene fluoride. Piezoelectric transducer material of this type is sold by the Pennwalt company under the trademark KYNAR. This material has high directional sensitivity to sound waves and is available in thicknesses in the range of 0.4 to 30 mil. Because it is so thin, the microphone 60 may be placed on the exterior surface of cover plate 43 between the plate and the interior surface of the rotatable tubular wall 36 of the feed roll 20. However, microphone 60 may be mounted within cover plate 43 if desired.

From FIG. 1 it is seen that the metal detector assembly 42 may be mounted on shaft 31 at an angle such that the top cover plate 43 faces toward the shaft 19 on which the upper front feed roll 18 is mounted. The microphone 60 is thus directed normal to the crop feed path and toward the region where stones or other hard objects in the crop material are most likely to impact one of the feed rolls 18, 20. This, coupled with the highly directional sound pickup characteristic of the microphone 60 enable it to better sense sounds resulting from impacts of hard objects on the feed rolls 18, 20 while discriminating against other sounds and vibrations such as occur during normal operation of the forage harvester. However, as subsequently described with reference to FIG. 4, it is not essential that the microphone be directed normal to the crop feed path.

It is preferable that the microphone 60 be located in the lower front feed roll 20. If it is positioned in one of the rear feed rolls 21, 22 then there may be insufficient time to detect a hard foreign object and stop the crop feed mechanism before the object reaches cutterhead 23 and shearbar 26. The lower front feed roll 20 is preferred over the upper front feed roll 18 because the hard foreign objects, being heavier than the crop material, tend to gravitate to the bottom of the mat of crop material and are more likely to impact the lower feed roll. Thus, if the microphone 60 is placed in the lower front feed roll 20 it is closer to the region most likely to be impacted by the foreign objects.

Figure 4:
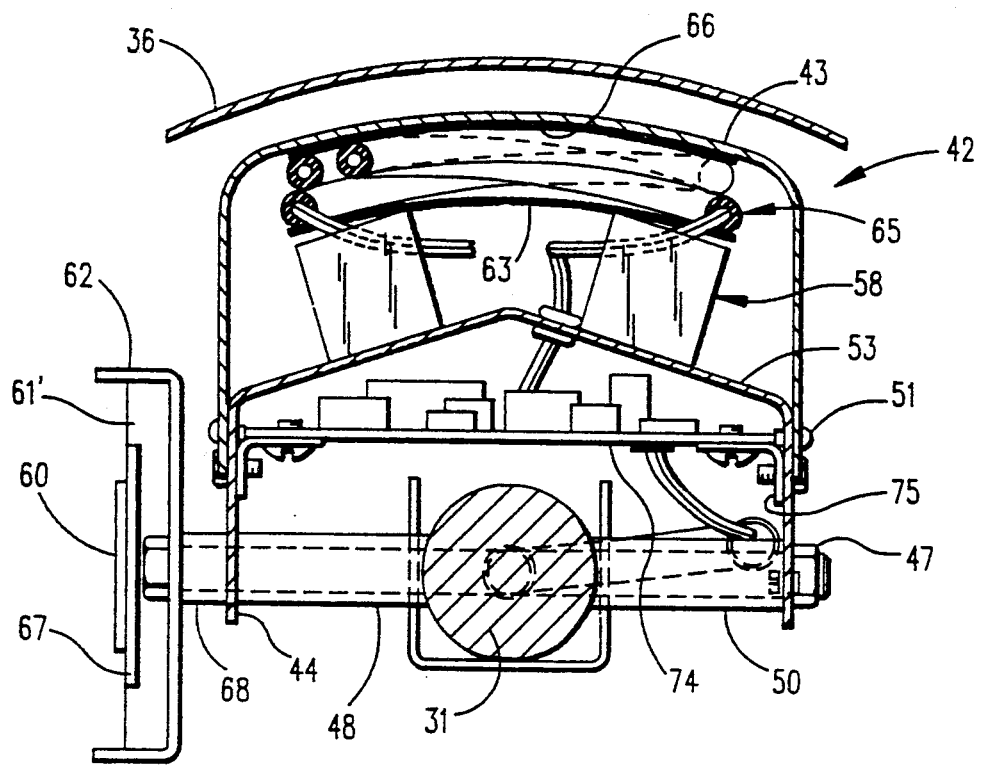
FIG. 4 is a view similar to FIG. 3 showing a modified form of support for a microphone; and, FIG. 5 is a block diagram of the crop feed stop control circuit.
Figure 5:
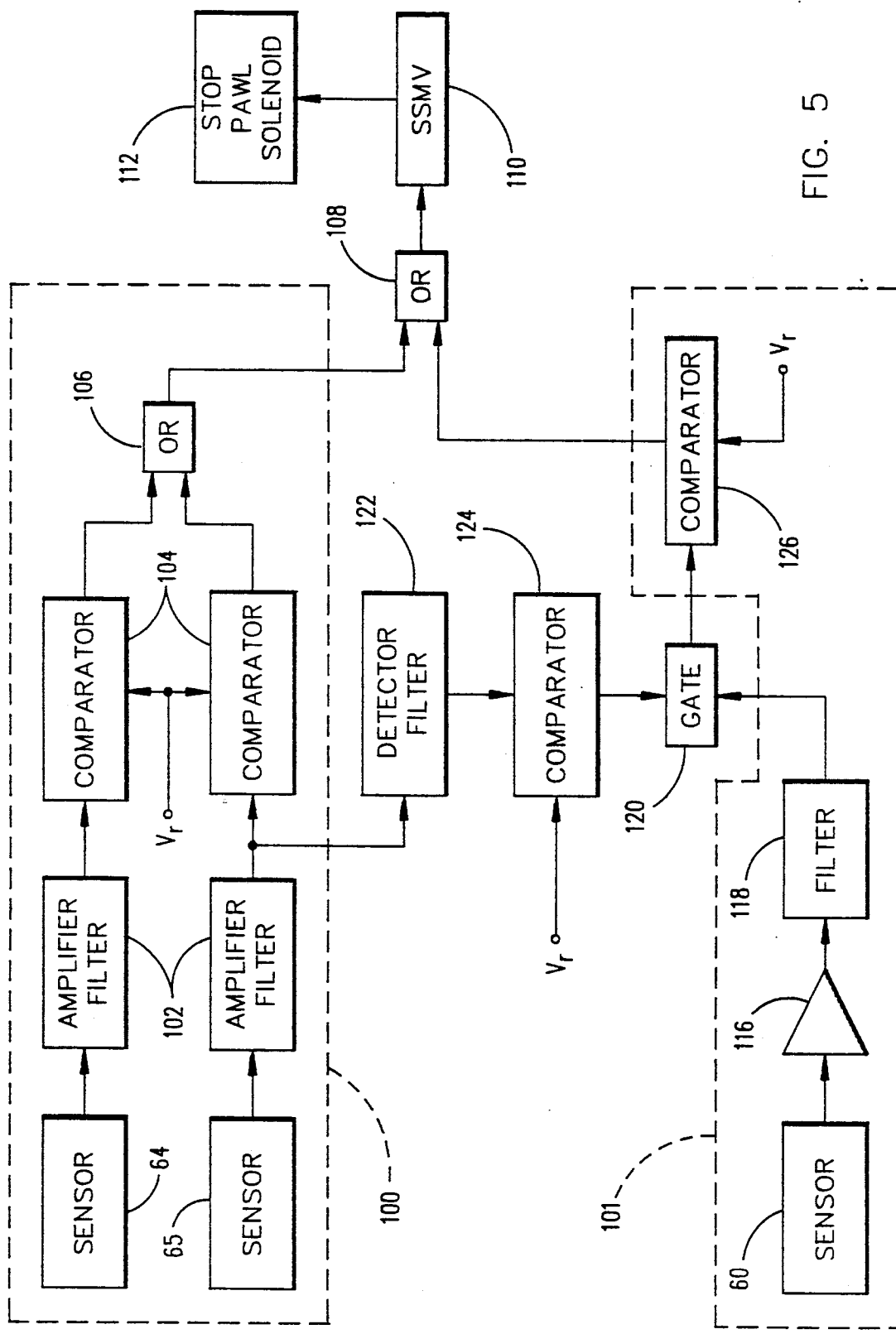

FIG. 4 shows an alternative embodiment of a means for mounting the microphone 60. In this embodiment a mounting bracket in the form of a U-shaped channel 62 is supported from stationary shaft 31 by bolts 46 which extend through spacers 68. The microphone 60 is mounted on a printed circuit board 67 which includes the electrical components necessary for processing output signals produced by the microphone. The printed circuit board is supported by the channel 62 with a pad 61' of foam rubber or other vibration-absorbing material being interposed between the channel and the printed circuit board. Leads (not shown) from the printed circuit board 67 may be routed through a hole in mounting plate 44 and the channel in fixed shaft 31 to circuits for controlling the crop feed mechanism. FIG. 5 is a block diagram of a circuit for controlling the stopping of the crop feed mechanism in response to the detection of a metal or other hard object in the crop feed. For the detection of stones and other hard foreign objects the circuit includes the microphone sensor 60 having its output connected through an amplifier 116 to a band pass filter 118 which filters out frequencies above or below the frequency range characteristic of impacts of hard objects on the feed mechanism. The output of filter 118 is applied to an analog gate 120 and, assuming the gate is enabled as subsequently described, the output of filter 118 is applied to a threshold detector or comparator 126 where it is compared with a reference signal $V_r$. The purpose of comparator 126 is to block small amplitude signals produced by microphone sensor 60 such as those signals produced upon sensing noises generated by the harvester during normal operation.

When the magnitude of the output signal from gate 120 exceeds $V_r$, comparator 126 produces an output signal which passes through OR 108 to trigger a single shot multivibrator (SSMV) 110. The SSMV 110 produces an output signal of fixed duration each time it is triggered. This signal is applied to a stop pawl solenoid 112 to deenergize the solenoid.

As explained in U.S. Pat. No. 3,959,953, the forage harvester illustrated in FIG. 1 is provided with a crop feed mechanism which includes a ratchet wheel and a cooperating solenoid-actuated, spring biased, stop pawl. The solenoid (corresponding to solenoid 112) is normally energized so that the crop feed mechanism, including upper and lower front feed rolls 18 and 20 and upper and lower rear feed rolls 21, 22 may be driven. When the solenoid is deenergized, the pawl is moved into engagement with the ratchet by the spring, thereby stopping the crop feed mechanism. A slip clutch is provided so that the stopping of the crop feed mechanism does not damage the drive train of the harvester. The stop pawl may be reset after the deenergizing signal from SSMV 110 is terminated by reversely driving the crop feed mechanism.

Acoustic hard object detectors used in agricultural machines exhibit a sensitivity to the noise which occurs at the time the crop feed mechanism starts up. This noise can generate signals in the sensor via air or structure borne coupling and the generated signals are comparable in character to signals resulting from the impact of hard objects on the feed rolls. In the past the sensitivity of acoustic object detectors has been reduced by adjusting the threshold reference $V_r$ applied to threshold comparator 126 to thereby prevent outputs from the detector during start-up. However, this reduced sensitivity compromises the ability of the detector to detect some stones, particularly small stones.

The circuit of FIG. 5 solves the problem of start-up noise by disabling the output of the acoustic object detector 101 while the crop feed mechanism is stopped and for a short interval after it is started. FIG. 5 shows the circuits of a two-channel metal detector 100 of the type described in U.S. Pat. No. 4,433,528. Each channel of the metal detector includes a sensing coil 64 or 65 having its output connected through a respective amplifier and filter circuit 102 to one input of a threshold comparator 104. The comparators receive a reference voltage $V_r$ at a second input and the outputs of the comparators are connected to an OR 106. The reference voltage applied to comparator 104 is set to a value such that noise signals, generated by sensor 65 as the result of sensing moving metal parts of the feed mechanism, will not cause the comparator 104 to produce an output signal.

When either of the sensors 64, 65 senses the presence of a piece of ferrous metal in the crop material being fed through the harvester, the sensor produces an output signal to the circuit 102. This circuit amplifies the sensor output signal and filters it to pass the frequencies characteristic of metal objects moving in the magnetic field of magnets 54, 58. The filtered signal is then compared with $V_r$ by comparator 104 and if the magnitude of the signal is greater than $V_r$ the comparator produces an output signal which passes through OR 106 and OR 108 to trigger SSMV 110. The output of SSMV 110 deenergizes stop pawl solenoid 112 to stop the crop feed mechanism as described above.

To disarm the output of acoustic object detector 101 during the start-up of the crop feed mechanism, the output of the amplifier and filter circuit 102 in either channel of the metal detector is connected to a detector/low pass filter circuit 122. The output of this circuit is connected to a threshold comparator 124 which compares the magnitude of the signal from circuit 122 with a reference voltage $V_r$. The output of comparator 124 is applied as an enable/disable signal to the analog gate 120.

When the crop feed mechanism is at rest, the output of amplifier and filter circuit 102 is minimal hence the signal applied to comparator 124 is less than $V_r$. The resulting output signal from comparator 124 blocks gate 120 so that any signal produced by acoustic sensor 60 is prevented from passing through the gate. The acoustic object detector 101 is therefor unable to produce an output signal from comparator 126. This insures that during repair and maintenance intervals vibrations and sounds produced by tools impacting the harvester will not cause detector 101 to produce an output signal to inadvertently release the stop pawl solenoid 112.

When the crop feed drive is engaged, and the crop feed mechanism begins to move, the movement of metal parts in the crop feed mechanism within the field of sensing coils 64, 65 causes the outputs of the sensors to rise. The signal from sensor 65 acts through amplifier/filter 102 and detector/filter 122 to apply a signal to comparator 124. The reference signal $V_r$ is chosen such that it is greater than the signal from detector/filter 122 during the start-up interval so that the gate 120 remains blocked. Thus, signals produced by acoustic sensor 60 during the start-up interval are blocked and acoustic object detector 101 produces no output signal. This insures that sounds and vibrations peculiar to the start-up of the crop feed mechanism will not cause detector 101 to produce an output signal.

Since the magnitude of the output signal from sensor 65 is in part dependent on the velocity of metal members (including machine parts) moving within its sensing field, the output signal from sensor 65, and thus the output signal from detector/filter 122 continues to rise until the crop feed mechanism reaches its normal running speed. As the crop feed mechanism reaches approximately one-quarter of its running speed, the output of detector/filter 122 exceeds $V_r$ and comparator 124 produces an output signal to enable the gate 120. Therefore, any signal produced by acoustic sensor 60 after the crop feed mechanism has reached enabling speed may pass through gate 120 to comparator 126 and, if the signal applied to comparator 126 is greater than $V_r$, the comparator will produce a signal to stop the crop feed mechanism as described above.

It is evident that the acoustic hard object detection system described above is more sensitive and reliable than acoustic detection systems of the prior art. This increased sensitivity results from several factors including the directional sensitivity of the microphone 60 and its location close to the most likely region of impact of foreign objects. Furthermore, because of the acoustic detector is inhibited during start up of the crop feed mechanism, the reference voltage $V_r$ applied to comparator 126 may be set to a lower value thus enabling the detection of lower magnitude output signals from acoustic sensor 66 during normal operation.

The start-up noise inhibiting feature is provided with no modification of existing circuits and with the addition of only the detector/filter 122, comparator 124 and analog gate 120. These elements, as well as the amplifier 116, filter 118, comparator 126 and OR 108 may conveniently be mounted on printed circuit board 74 which is already present in forage harvesters having a metal detector if the mounting arrangement shown in FIG. 3 is utilized. If the mounting arrangement of FIG. 4 is utilized, the elements 116, 118, 120, 122, 124, 126 and 108 may be included on printed circuit board 67.

While a preferred embodiment of the invention has been described in specific detail for purposes of illustration, it will be understood that various modifications and substitutions may be made in the described embodiment without departing from the spirit and scope of the invention as defined by the appended claims. For example, in apparatus having no metal detector, the gate 120 may be controlled by the output of a timer or delay circuit actuated concurrently with the crop feed mechanism and producing an output signal to enable gate 120 after an interval of time sufficient for the crop feed mechanism to reach one-quarter of its normal operating speed. In a further arrangement, the gate 120 may be eliminated and a logic AND gate provided, the AND gate being responsive to comparators 124 and 126 and having its output connected to OR 108. The method and apparatus of the invention may be used with acoustic sensors responsive to air-borne sound waves or mechanically transmitted vibrations.

The invention in which an exclusive property or privilege is claimed is defined as follows;

1. In a forage harvester having a crop feed mechanism for transporting a crop material to a cutterhead, means for stopping the crop feed mechanism, an acoustic sensor for sensing the impact of hard objects on said feed mechanism, and circuit means responsive to said acoustic sensor for actuating said stop means when an impact is sensed by said acoustic sensor, the improvement comprising:
   control means for producing a first signal during intervals said crop feed mechanism is at rest or running at less than a predetermined speed and a second signal during intervals said crop feed mechanism is running at least as fast as said predetermined speed, said control means being connected to said circuit means to inhibit actuation of said stop means by said circuit means during intervals when said first signal is produced.

2. The improvement as claimed in claim 1 wherein said control means includes sensor means for sensing movement of said crop feed mechanism and producing an output signal whose magnitude depends on the rate of movement of said crop feed mechanism; and means responsive to said output signal for producing said first signal only when said output signal is less than a predetermined magnitude.

3. The improvement as claimed in claim 2 wherein said sensor means comprises a sensing coil of a magnetic metal detector for detecting the presence of metal in the crop material being transported, said metal detector further comprising means connected to said sensing coil for energizing said stop means when said output signal is at least as great as a threshold value.

4. The improvement as claimed in claim 1 wherein:
   said control means comprises sensing means responsive to the rate of movement of said crop feed mechanism or the presence of metal in the crop material being transported for producing an output signal, threshold comparator means responsive to said sensing means for producing said first signal only when the magnitude of said output signal is less than a reference magnitude, and gating means responsive to said threshold comparator means for inhibiting passage of a signal from said acoustic sensor through said circuit means.

5. The improvement as claimed in claim 4 and further comprising second threshold comparator means responsive to said sensing means for producing a second signal only when the magnitude of said output signal is at least as great as a second reference magnitude; and means responsive to said second signal for actuating said stop means.

6. The improvement as claimed in claim 5 wherein said first threshold comparator means comprises means for comparing said output signal with a first threshold value and said second threshold comparator means comprises means for comparing said output signal with a second threshold value, said second threshold value being greater than the first threshold value.

7. In an apparatus having a feed mechanism for transporting a material means for stopping the feed mechanism, a sensor for sensing the impact of hard objects on said feed mechanism, and circuit means responsive to said sensor for actuating said stop means when an impact is sensed by said sensor, the improvement comprising:

control means for producing a first signal during intervals said feed mechanism is at rest or running at less than a predetermined speed and a second signal during intervals said feed mechanism is running at least as fast as said predetermined speed, said control means being connected to said circuit means to inhibit actuation of said stop means by said circuit means during intervals when said first signal is produced.

8. The improvement as claimed in claim 7 wherein said control means includes sensor means for sensing movement of said feed mechanism and producing an output signal whose magnitude depends on the rate of movement of said feed mechanism; and means responsive to said output signal for producing said first signal only when said output signal is less than a predetermined magnitude.

9. The improvement as claimed in claim 8 wherein said sensor means comprises a sensing coil of a magnetic metal detector for detecting the presence of metal in the material being transported, and means connected to said sensing coil for energizing said stop means when said output signal is at least as great as a threshold value.

10. In an apparatus having a feed mechanism for transporting a material, detector means for detecting impacts of hard foreign objects in the material on the feed mechanism, and stop means for stopping the feed mechanism on detection of an impact, a method of preventing the detector means from actuating said stop mechanism in response to noise generated as said feed mechanism is started, said method comprising:

actuating said feed mechanism; and delaying the enablement of said detector means until after said feed mechanism has reached a predetermined enabling speed.

* * * * *